United States Patent
Tsukio et al.

(10) Patent No.: US 7,818,635 B2
(45) Date of Patent: Oct. 19, 2010

(54) DIGITAL BROADCAST RECEIVER

(75) Inventors: Yasunobu Tsukio, Osaka (JP); Hiroaki Ozeki, Osaka (JP); Keiichi Kitazawa, Gifu (JP)

(73) Assignee: Panasonic Corporation, Osaka (JP)

( * ) Notice: Subject to any disclaimer, the term of this patent is extended or adjusted under 35 U.S.C. 154(b) by 220 days.

(21) Appl. No.: 11/911,986

(22) PCT Filed: Apr. 27, 2006

(86) PCT No.: PCT/JP2006/308837

§ 371 (c)(1),
(2), (4) Date: Oct. 19, 2007

(87) PCT Pub. No.: WO2006/118194

PCT Pub. Date: Nov. 9, 2006

(65) Prior Publication Data

US 2009/0063911 A1    Mar. 5, 2009

(30) Foreign Application Priority Data

Apr. 28, 2005    (JP)    ............................... 2005-131966

(51) Int. Cl.
G06F 11/00    (2006.01)

(52) U.S. Cl. .................. 714/708; 714/704; 714/705; 714/709; 714/745; 375/260; 375/347; 375/349; 455/272; 455/575.7; 455/132; 455/574; 455/127.5; 370/206; 370/207; 370/343; 370/368; 348/731

(58) Field of Classification Search .................. None
See application file for complete search history.

(56) References Cited

U.S. PATENT DOCUMENTS 5,390,357 A * 2/1995 Nobusawa et al. .......... 455/134
5,644,597 A * 7/1997 Ueda .......................... 375/232
6,600,907 B1 * 7/2003 Taguchi ...................... 455/132
6,871,052 B2 * 3/2005 Spencer et al. ........... 455/226.2
6,963,733 B2 * 11/2005 Eriksson et al. ............. 455/132
2002/0141520 A1 * 10/2002 Nigrin et al. ................ 375/347
2004/0203541 A1 * 10/2004 Coan et al. ............... 455/115.1
2004/0253955 A1 * 12/2004 Love et al. .................. 455/442

(Continued)

FOREIGN PATENT DOCUMENTS

CN    1383629 A    12/2002

(Continued)

OTHER PUBLICATIONS

International Search Report for Application No. PCT/JP2006/308837 dated Jul. 18, 2006.

(Continued)

*Primary Examiner*—John P Trimmings
(74) *Attorney, Agent, or Firm*—RatnerPrestia

(57) ABSTRACT

In a digital broadcast receiver, when a bit error rate (BER) is larger than a threshold in a BER determining part, power is supplied to a first tuner and a second tuner for diversity reception. When the BER is smaller than the threshold, power supply to one of the first tuner and the second tuner is stopped for single reception. This structure allows power supply to one of the tuners to be stopped in excellent reception environments, thus reducing power consumption.

12 Claims, 7 Drawing Sheets

U.S. PATENT DOCUMENTS

| | | | |
|---|---|---|---|
| 2005/0111600 A1* | 5/2005 | Okada | 375/347 |
| 2005/0245224 A1* | 11/2005 | Kurioka | 455/272 |
| 2006/0050773 A1* | 3/2006 | Yano | 375/148 |
| 2006/0067442 A1* | 3/2006 | Tanaka | 375/347 |
| 2006/0164298 A1* | 7/2006 | Azuma | 342/368 |

FOREIGN PATENT DOCUMENTS

| | | | |
|---|---|---|---|
| EP | 1 463 215 A | | 9/2004 |
| JP | 07-273705 | * | 10/1995 |
| JP | 07-273705 A | | 10/1995 |
| JP | 09-149012 | * | 6/1997 |
| JP | 09-149012 A | | 6/1997 |
| JP | 10-022886 A | | 1/1998 |
| JP | 2000-252896 | * | 9/2000 |
| JP | 2000-252896 A | | 9/2000 |
| JP | 2000-307492 A | | 11/2000 |
| JP | 2000-332665 A | | 11/2000 |
| JP | 2001-156738 | * | 6/2001 |
| JP | 2001-156738 A | | 6/2001 |
| JP | 2004-320528 A | | 11/2004 |

OTHER PUBLICATIONS

Supplementary European Search Report for Application No. EP 06745765, Jun. 17, 2009, Panasonic Corporation.

* cited by examiner

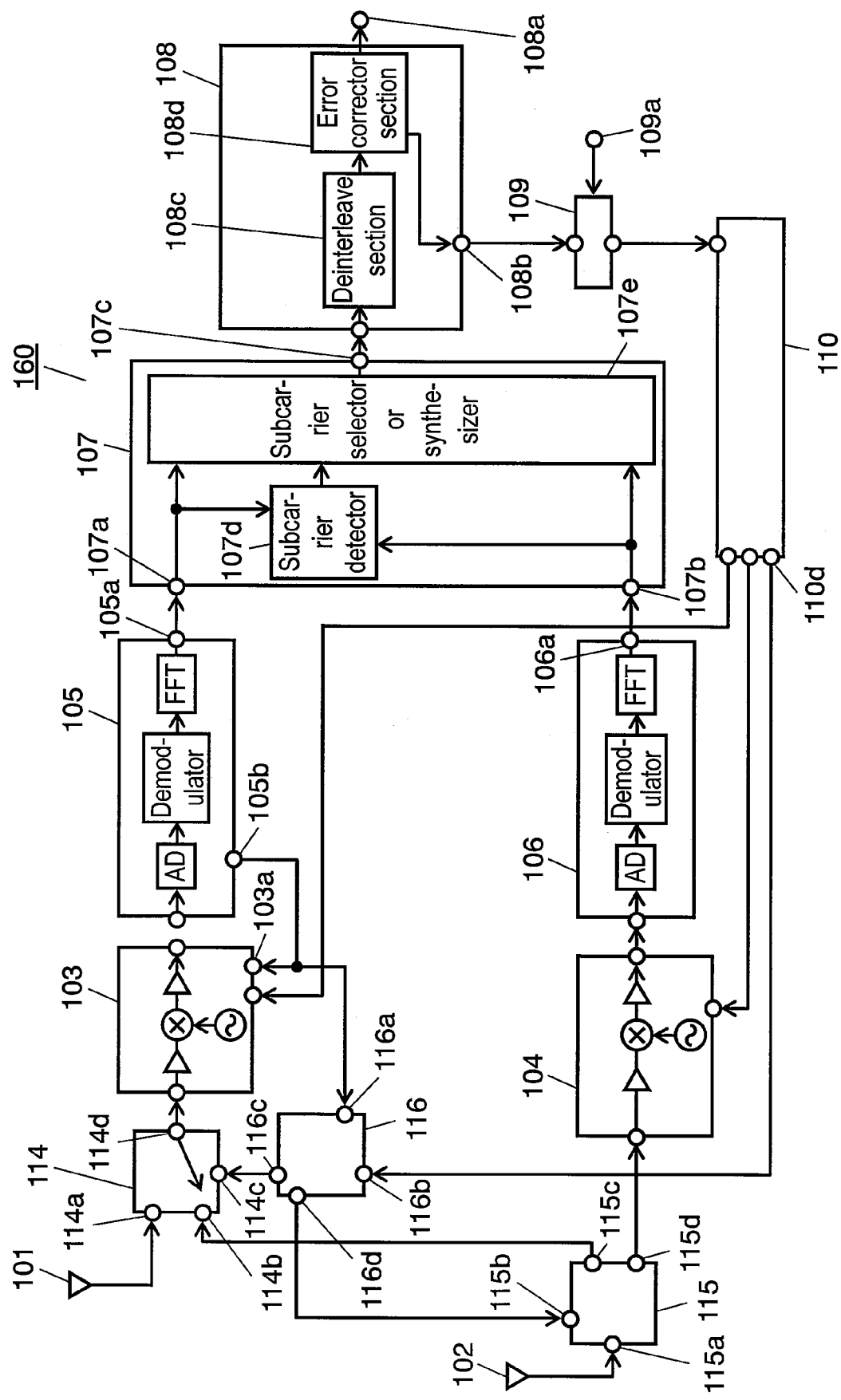

DIGITAL BROADCAST RECEIVER

TECHNICAL FIELD

The present invention relates to a digital broadcast receiver capable of receiving radio-frequency (RF) signals with a plurality of antennas and improving reception conditions thereof using a diversity reception system.

BACKGROUND ART

Recently, digital terrestrial broadcasting service using the orthogonal frequency division multiple (hereinafter abbreviated as "OFDM") method has been started. Further planned is digital terrestrial broadcasting service for mobile devices that can be viewed and listened to even by a portable receiving terminal.

In the portable receiving terminal, a small antenna having a reception position lower than that of a large antenna generally for domestic use receives a broadcast. In addition, because the user of the portable receiving terminal views or listens to a broadcast while moving, its reception environment is more considerably deteriorated than that of a domestic television receiver. For this reason, in the portable receiving terminal, it is an important problem to restore the waveforms of transmission signals from the waveforms of received signals and reproduce broadcast programs, in poor reception environments having frequency-selective strains of transmission paths caused by multipath or phasing caused by reception during moving.

It has conventionally been known that diversity reception technology is effective in such poor reception environments. For example, in a space-diversity reception system, two antennas are installed to be separated spatially enough. Power of the signals received by each antenna is compared, and the signals are selected or synthesized. In this manner, the waveforms of the signals at transmission can be restored, even when the power received by one of the antennas is low, but the power received by the other antenna is high.

The OFDM method is a method of transferring signals using a plurality of carrier waves (hereinafter abbreviated as "subcarrier") orthogonal to each other. For this purpose, in the OFDM method, the signals received by the respective antennas undergo the Fourier transform to be decomposed into subcarriers on a frequency axis, and selected or synthesized for every subcarrier. This can significantly reduce deterioration caused by frequency-selective strains of transmission paths.

Japanese Patent Unexamined Publication No. 2001-156738 discloses an OFDM diversity receiver capable of performing effective diversity so that error correction characteristics are improved even when specific subcarriers are interfered.

However, in the diversity reception system of selecting and synthesizing signals for each subcarrier, because the signals received by antennas are transformed into signals for each subcarrier, tuners and digital demodulators in the same number as antennas are necessary. This structure more considerably increases power consumption than a single reception method using one antenna. Because most portable terminals for receiving digital broadcasting service are powered by batteries, minimizing the power consumption is a large problem of the diversity reception.

SUMMARY OF THE INVENTION

A digital broadcast receiver includes: a first antenna and a second antenna for receiving OFDM digital signals; a first tuner and a second tuner connected to the first antenna and a second antenna, respectively, for converting the OFDM digital signals into intermediate-frequency (IF) signals; a first digital demodulator and a second digital demodulator connected to an output of the first tuner and an output of the second tuner, respectively, for converting the IF signal into digital signal, and demodulating the digital signal into demodulated signal for output; a diversity part connected to the first digital demodulator and the second digital demodulator for selecting or synthesizing two demodulated signals for output; an error corrector connected to the diversity part, having an output terminal for supplying signals having undergone error correction, and supplying a bit error rate (hereinafter abbreviated as "BER"); a BER determining part for receiving the BER, comparing the BER with a preset BER threshold, and supplying a determining signal; and a diversity controller for receiving the determining signal from the BER determining part and controlling start or stop of power supply to the first tuner or the second tuner. When the BER is larger than the preset BER threshold, the diversity controller starts power supply to the first tuner and the second tuners for diversity reception. When the BER is smaller than the preset BER threshold, the diversity controller stops power supply to the first tuner or the second tuner for single reception.

With such a structure including the BER determining part and the diversity controller, according to the determining signal from the BER determining part, power is supplied to both tuners in a poor reception condition to improve the reception condition, and power supplied to one of the tuners can be stopped in an excellent reception condition. This structure can reduce power consumption of the receiver.

BRIEF DESCRIPTION OF THE DRAWINGS

FIG. 8 is a block diagram of a digital broadcast receiver in accordance with a seventh exemplary embodiment of the present invention.

REFERENCE MARKS IN THE DRAWINGS

100 Digital broadcast receiver
101 Antenna (first antenna)
102 Antenna (second antenna)
103 Tuner (first tuner)
104 Tuner (second tuner)
105 Digital demodulator (first digital demodulator)

106 Digital demodulator (second digital demodulator)
107 Diversity part
108 Error corrector
109 BER determining part
110 Diversity controller

DETAILED DESCRIPTION OF PREFERRED EMBODIMENTS

Hereinafter, descriptions are provided of exemplary embodiments of the present invention with reference to the accompanying drawings.

First Exemplary Embodiment

Figure 1:
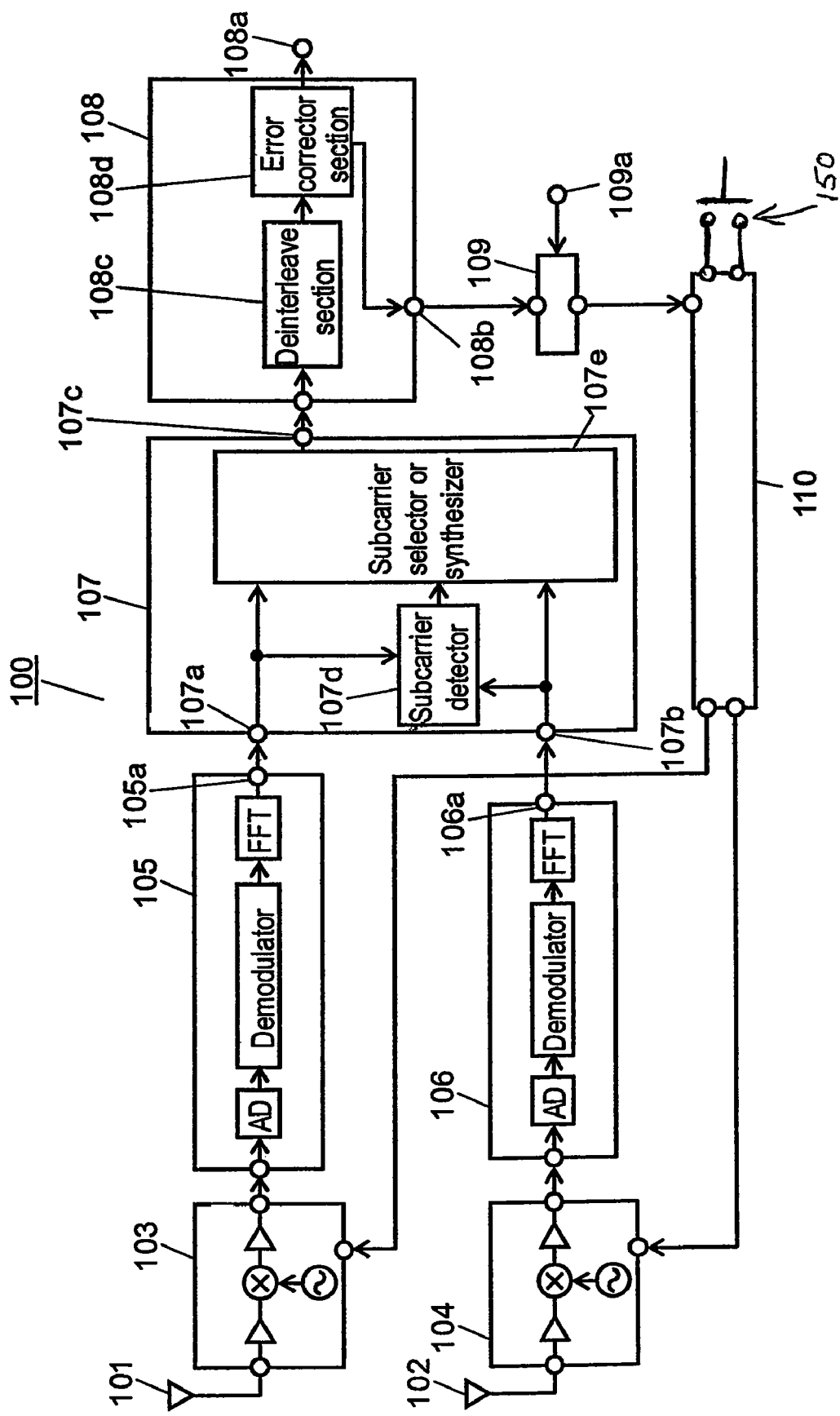
FIG. 1 is a block diagram of a digital broadcast receiver in accordance with a first exemplary embodiment of the present invention.

FIG. 1 is a block diagram of digital broadcast receiver 100 in accordance with the first exemplary of the present invention. Digital broadcast receiver 100 of this embodiment includes the following components: antennas 101 and 102, i.e. first and second antennas, respectively, each receiving an OFDM digital signal; tuners 103 and 104, i.e. first and second tuners, respectively, having respective input terminals connected to output terminals of antennas 101 and 102; digital demodulators 105 and 106, i.e. first and second digital demodulators, connected to the output terminals of tuners 103 and 104, respectively; diversity part 107 having input terminals 107a and 107b connected to output terminals 105a and 106a of digital demodulators 105 and 106, respectively; error corrector 108 connected to output terminal 107c of diversity part 107; transport stream (TS) output terminal 108a for outputting a TS signal having undergone error correction from error corrector 108; BER determining part 109 connected to output terminal 108b of error corrector 108; and diversity controller 110 connected to the output of BER determining part 109 and to power lines for supplying power to tuners 103 and 104.

Diversity part 107 includes: subcarrier detector 107d for receiving demodulated signals supplied from output terminals 105a and 106a of digital demodulators 105 and 106, respectively; and subcarrier selector or synthesizer 107e for receiving the demodulated signals supplied from output terminals 105a and 106a and a control signal related to selection or synthesis from subcarrier detector 107d.

Error corrector 108 includes deinterleave section 108c and error corrector section 108d in the direction from the input terminal to output terminal 108a of error corrector 108. The error correction signal supplied from error correction section 108d is led to output terminal 108a. The BER supplied from error corrector section 108d is led to output terminal 108b.

Next, a description is provided of signal processing operation in each block of digital broadcast receiver 100 structured as above.

Tuners 103 and 104 convert signal components of frequencies corresponding to a desired channel among radio-frequency (RF) signals received by antennas 101 and 102 into intermediate-frequency (IF) signals, using respective mixers. The IF signals are amplified to a predetermined power level by respective amplifiers so as to be fed into corresponding digital demodulators 105 and 106.

Digital demodulators 105 and 106 receive analog IF signals supplied from tuners 103 and 104, and analog-to-digital (A/D) converters therein (shown as "AD" in the drawings) convert the analog signals to respective digital signals. Then, after quadrature demodulators (shown as "demodulator" in the drawings) perform quadrature demodulation on the digital signals and supply complex digital signals, fast Fourier transformers (shown as "FFT" in the drawings) perform fast Fourier transformation (hereinafter abbreviated as "FFT") on the complex digital signals to decompose the signals into subcarrier signals on a frequency axis. The demodulated signals are supplied from output terminals 105a and 106a.

In diversity part 107, first, subcarrier detector 107d measures the quality of the demodulated signals supplied from digital demodulators 105 and 106 for each subcarrier. Then, subcarrier selector or synthesizer 107e selects or synthesizes the signals based on the quality thereof for each subcarrier, and outputs the selected or synthesized signals.

Subcarrier detector 107d measures the quality of the signals, using a ratio of the reception level with respect to the noise level in subcarriers (herein after abbreviated as "CN ratio"). Subcarrier selector or synthesizer 107e always generates a signal having a CN ratio higher than those of the two demodulated signals by selecting the higher one from the respective demodulated signals for each subcarrier based on the CN ratio for each subcarrier, or synthesizing both signals using the CN ratio as a weighting coefficient.

Deinterleave section 108c in error corrector 108 deinterleaves the signal selected or synthesized by diversity part 107. Deinterleaving operation is a process of undoing interleave performed on the signals at the broadcasting station. Then, error corrector section 108d corrects errors of the signal according to error-correcting codes, outputs a signal after error correction to output terminal 108a, and outputs a BER to output terminal 108b.

BER determining part 109 receives the BER supplied from error corrector 108, compares the BER with a preset BER threshold, and outputs a determining signal.

According to the determining signal supplied from BER determining part 109, diversity controller 110 controls power supply to one of tuners 103 and 104. In other words, the diversity controller 110 starts power supply to tuners 103 and 104, i.e. first and second tuners, for diversity reception, when the BER is larger than the preset BER threshold. The diversity controller 110 stops power supply to one of tuners 103 and 104, i.e. first and second tuners, for single reception, when the BER is smaller than the preset BER threshold.

Next, a description is provided of a detection method used by digital broadcast receiver 100 to switch between diversity reception and single reception. In this detection method, a gain control voltage (hereinafter abbreviated as "AGC voltage") of the amplifier, CN ratio, packet error rate (PER) can be used other than a BER.

However, while the AGC voltage has the highest trackability, the level required for reception without errors changes depending on the number of waves in the multipath or moving speeds, and thus the AGC voltage has low reliability as the index of reception conditions. Similarly, the CN ratio has low reliability because the CN ratio required for reception without errors changes depending on reception conditions. In contrast, the PER has the highest reliability, but low trackability. The BER has high reliability, and the time required for measurement is sufficiently shorter than that of the PER. Thus, having excellent balance between the trackability to changes in reception environment and the reliability as the index of reception conditions, the BER is most appropriate as a detection method used for switching between diversity reception and single reception.

Next, a description is provided of operation where digital broadcast receiver 100 attains excellent reception conditions and low power consumption at the same time.

At the start of broadcast reception, digital broadcast receiver 100 supplies power to both tuners 103 and 104 for diversity reception. At this time, two antennas 101 and 102 receive RF broadcast signals, and corresponding tuners 103 and 104 and digital demodulators 105 and 106 process the signals. Then, diversity part 107 selects or synthesizes two demodulated signals for each subcarrier. This operation generates signals having higher quality than those received by one antenna. In this manner, even in poor reception environments, such as a multipath environment and phasing environment, reception conditions are more improved as two antennas receive signals having lower correlation with each other.

However, because the diversity reception requires two blocks, each including components from an antenna to digital demodulator, the diversity reception consumes substantially twice the power of single reception. Thus, in excellent reception environments, single reception is advantageous in power consumption. For this reason, in excellent reception environments, diversity controller 110 supplies power to one of tuners 103 and 104 having a more excellent reception environment and stops power supply to the other, to switch the receiver from diversity reception to single reception.

Next, a detailed description is provided of operation where digital broadcast receiver 100 switches from diversity reception used in poor reception environments to single reception used in excellent reception environments.

Used in digital broadcasting service as error-correcting codes are the following two kinds: a read solomon (RS) code and convolution code. Digital broadcast receiver 100 corrects errors using the convolution codes by the Viterbi decoding method. As a guideline of reception conditions, it is desirable that the bit error rate after Viterbi decoding (BER after Viterbi) is up to $2\times10^{-4}$. This is because, in this range, the BER after error correction using RS codes is substantially zero. Therefore, digital broadcast receiver 100 can receive video signals substantially without noises.

For example, when the BER after Viterbi is considerably smaller than $2\times10^{-4}$, the BER after Viterbi is smaller than $2\times10^{-4}$, even in single reception instead of diversity reception.

Then, as the BER threshold for switching reception methods, $1\times10^{-5}$, i.e. $2\times10^{-4}$ plus some margins, for example, is preset in BER determining part 109. BER determining part 109 receives a BER after Viterbi supplied from error corrector section 108. When the received BER after Viterbi is smaller than the preset BER threshold, BER determining part 109 supplies a determining signal for single reception. Diversity controller 110 stops power supply to one of tuners 103 and 104 having poorer reception conditions. This can save the power consumed by the one tuner.

Next, a description is provided of a procedure of selecting one of the tuners to which power supply is to be stopped.

By only using a BER after Viterbi, the diversity controller cannot tell which one of tuners 103 and 104 has received RF signals in poorer reception conditions. A portable terminal generally does not incorporate two antennas of the same type, and includes antennas of different types, e.g. combination of a whip antenna and earphone antenna, and combination of a whip antenna and built-in helical antenna in many cases.

For this reason, diversity controller 110 determines that one of the two antennas having a smaller mean gain is in poorer reception conditions than the other and stops power supply to the tuner connected to this antenna. For example, one antenna to be used for single reception can be a whip antenna instead of an earphone antenna, or a whip antenna instead of a built-in helical antenna.

The structures which will be described in the fourth and seventh exemplary embodiments address the problems posed when the gains of two antennas are equal, or the antenna in more excellent reception conditions is not fixed because of the relation between difference in antenna directivity and the arrival direction of broadcast waves.

Next, a description is provided of operation where digital broadcast receiver 100 switches single reception used in excellent reception environments to diversity reception used in poor reception environments.

When the BER after Viterbi is lager than a preset BER threshold during single reception, BER determining part 109 outputs a determining signal for diversity reception to diversity controller 110. Diversity controller 110 starts power supply to one of the tuners to which power supply has been stopped. This operation switches digital broadcast receiver 100 to diversity reception, thus improving the BER after Viterbi.

In this manner, diversity controller 110 starts or stops power supply to one of tuners 103 and 104. This can switch the digital broadcast receiver 110 between diversity reception for improving reception conditions and single reception for reducing power consumption, according to changes in reception environment. In other words, this exemplary embodiment provides more excellent reception conditions using diversity reception than terminals always using single reception, and smaller power consumption using single reception than terminals always using diversity reception.

In this exemplary embodiment, digital broadcast receiver 100 supplies power to both of tuners 103 and 104 for diversity reception at the start of receiving broadcast signals. However, for a digitized broadcast receiving terminal having strict requirements for power consumption, power supply to either one of the tuners may be stopped for single reception at the start of reception.

Switching the channel through which broadcast signals are received will change the receiving frequency and propagation conditions of the radio waves. This changes reception environments discontinuously before and after switching of the channel. For example, switching the channel during single reception can deteriorate reception conditions and cause noises in the video signal.

When the reception channel is switched during single reception as above, BER determining part 109 may output a determining signal for diversity reception independently of the BER supplied from error corrector 108, and diversity controller 110 may start power supply to one of the tuners to which power supply has been stopped to start diversity reception. This operation can inhibit deterioration in reception conditions even when the reception environments deteriorate discontinuously.

In this exemplary embodiment, $1\times10^{-5}$, i.e. $2\times10^{-4}$ plus some margins, for example, is preset in BER determining part 109, as the BER threshold for switching receiving methods. Then, the receiving method is switched between diversity reception and single reception according to this BER threshold. However, in this case, the BER after error correction using RS codes cannot always be made completely zero, and noises can sometimes be generated in decoded video signals. To inhibit such noises, digital broadcast receiver 100 may be structured to include a diversity activating button 150 to be pushed by the user. In this structure, when a user pushes the diversity activating button, a determining signal for diversity reception supplied independently of the BER from BER determining part 109 switches digital broadcast receiver 100 to diversity reception. Thus, the user can view an image nearer to its complete condition.

Further, battery-powered digital broadcast receiver 100 can be wired so that the function block for controlling the state of the battery in digital broadcast receiver 100 can acquire information on the remaining battery life. This structure can decrease the influence of increased power consumption by diversity reception on other functions of telephone or music reproduction in the receiver. In other words, a threshold of the remaining battery life is preset in BER determining part 109. When the remaining battery life is equal or smaller than the preset threshold, a determining signal for single reception is supplied. Then, digital broadcast receiver 100 is switched to single reception. This operation can prevent a sharp decrease in battery life.

Further, input terminal 109a may be provided so that a BER BER-determining part 109 uses to output a determining signal or a threshold of the remaining battery life can arbitrarily be set by external input. With this input terminal, the user can set a desired threshold according to the performance of antennas 101 and 102, tuners 103 and 104, and digital demodulators 105 and 106 in digital broadcast receiver 100. Thus, digital broadcast receiver 100 can be controlled as to be switched appropriately for the performance and functions thereof, including a BER and remaining battery life.

In this exemplary embodiment, digital broadcast receiver 100 receives digital broadcasting service by the OFDM method. However, the transmission method is not limited to the OFDM method, and the present invention is applicable to various kinds of digital transmission methods.

Second Exemplary Embodiment

Figure 2:
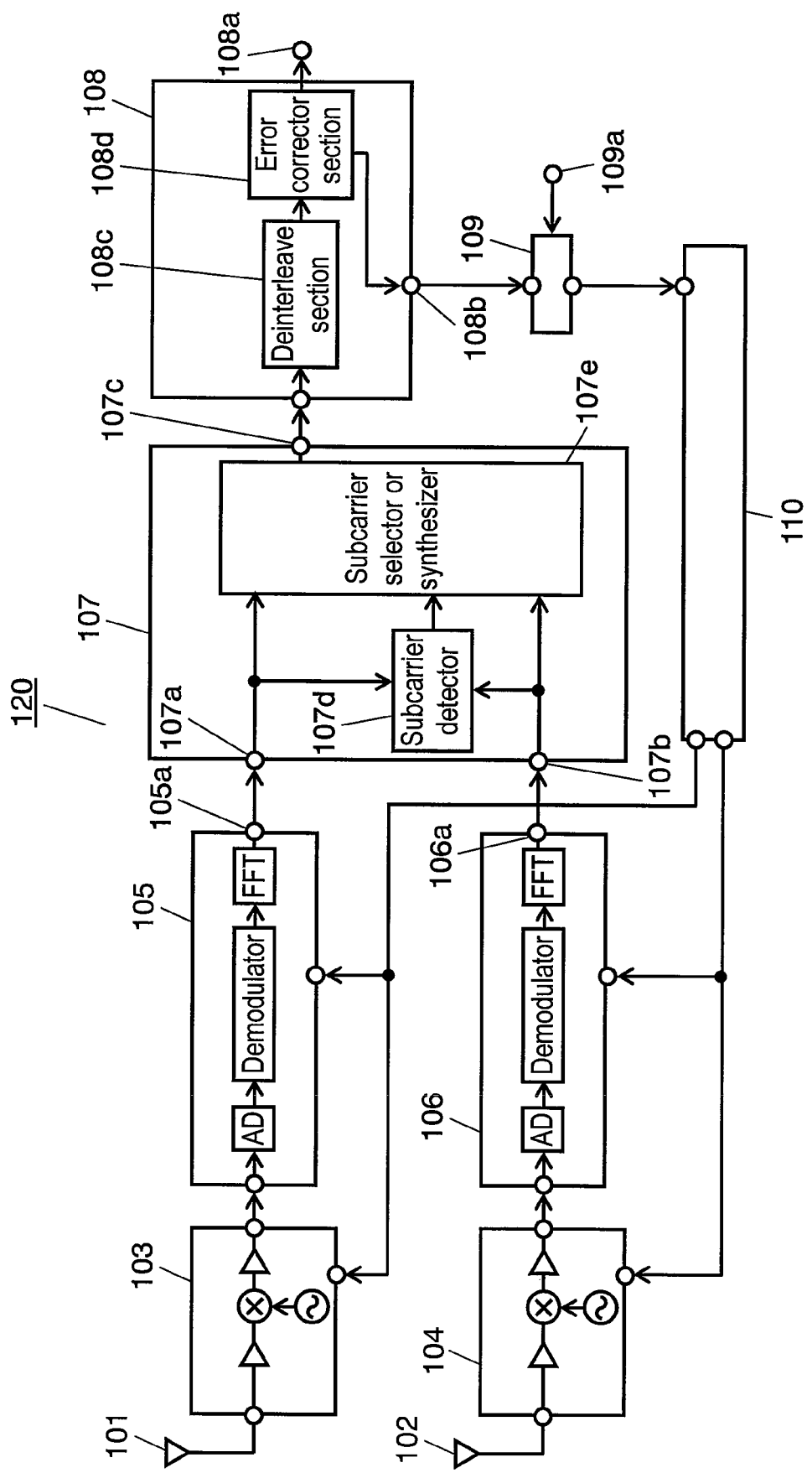
FIG. 2 is a block diagram of a digital broadcast receiver in accordance with a second exemplary embodiment of the present invention.

FIG. 2 is a block diagram of digital broadcast receiver 120 in accordance with the second exemplary embodiment of the present invention. Digital broadcast receiver 120 of this embodiment has another control input terminal in each of digital demodulators 105 and 106 in addition to the structure of the first exemplary embodiment in FIG. 1. The output terminals of diversity controller 110 are connected to the control input terminals in digital demodulators 105 and 106 in addition to the control input terminals in tuners 103 and 104.

With this structure, when power supply to one of tuners 103 and 104 is stopped, diversity controller 110 can control so that power supply to the corresponding one of demodulators 105 and 106 is stopped or started. Thus, when power supply to one of the tuners is stopped during single reception, diversity controller 110 can also stop power supply to the digital demodulator connected to the tuner.

While the power consumption of the first or second tuner is generally approx. several hundred milliwatts, the power consumption of the first or second digital demodulator ranges approx. several to several ten milliwatts. For this reason, during single reception, powering off only one tuner is effective in considerable reduction of power consumption. However, when digital broadcast receiver 120 is battery-powered, it must receive signals by consuming smaller power. It is preferable that powering off one of the digital demodulators unnecessary for single reception can further reduce power consumption. Because the tuner and demodulator are generally made of separate ICs, it is easy to power off only the tuner. However, to power off digital demodulator 105, the power supply systems in digital demodulator 105 must be made separate.

Third Exemplary Embodiment

Figure 3:
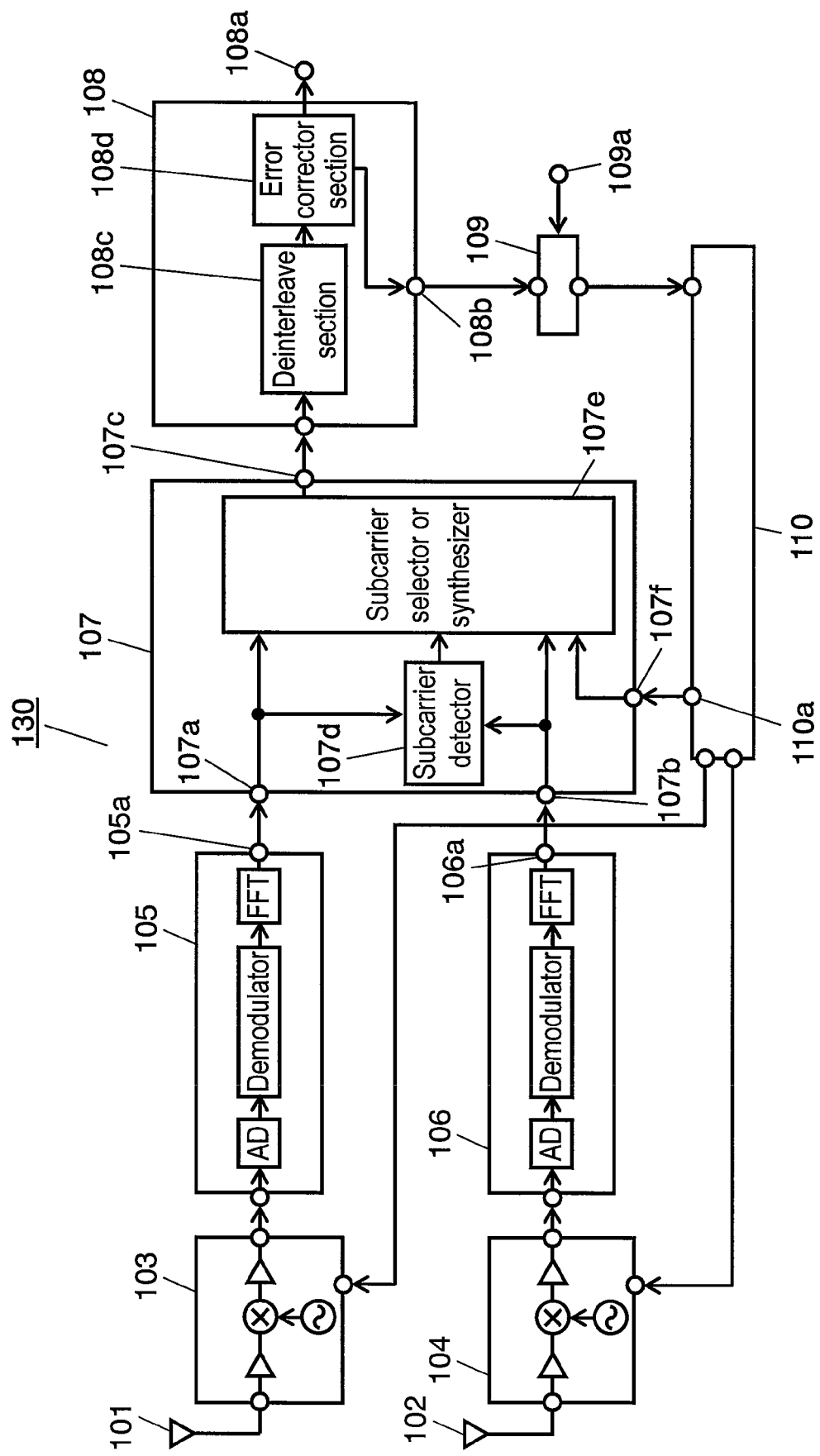
FIG. 3 is a block diagram of a digital broadcast receiver in accordance with a third exemplary embodiment of the present invention.

FIG. 3 is a block diagram of digital broadcast receiver 130 in accordance with the third exemplary embodiment of the present invention. For digital broadcast receiver 130 of this embodiment, diversity part 107 has another input terminal 107f, and diversity controller 110 further includes output terminal 110a in addition to the structure of the first embodiment in FIG. 1. Output terminal 110a of diversity controller 110 is connected to input terminal 107f of diversity part 107.

With this structure, diversity controller 110 can send, from output terminal 110a to input terminal 107f of diversity part 107, a selecting rate or synthesizing ratio at which diversity part 107 selects or synthesizes two input signals.

During single reception, diversity part 107 always selects one of a demodulated signal from tuner 103 via output terminal 105a of digital demodulator 105 and a demodulated signal from tuner 104 via output terminal 106a of digital demodulator 106 to which power is supplied, or always synthesizes one of the demodulated signals with the other at a ratio of 1:0. In other words, during single reception, diversity part 107 synthesizes a first output signal from one of the digital demodulators connected to one of the tuners to which power is supplied and a second output signal from the other digital demodulator connected to the other tuner to which power supply is stopped, at an output ratio of 1:0.

However, when the wiring between one tuner and corresponding digital demodulator is in proximity to the wiring between the other tuner and digital demodulator in a dual system, for example, poor isolation between the signals from tuner 103 and the signals from tuner 104 leaks a part of output signal power from one of the tuners into the signal wiring of the other tuner. Then, diversity part 107 selects or synthesizes a demodulated signal from the one tuner and a demodulated signal generated from the signal leaked into the other tuner. In this case, because two signals are the same, the correlation therebetween is one. For this reason, no improvement is obtained by selection or synthesis. On the contrary, synthesizing two signals with a phase difference depending on the path length along which the two signals leak deteriorates the CN ratio after synthesis.

For this problem, the influence of leakage power can be avoided by supplying, to error detector 108, the output from one of output terminal 105a of digital demodulator 105 connected to tuner 103 and output terminal 106a of digital demodulator 106 connected to tuner 104 to which power is supplied, during single reception. However, in this case, difference in delay time between diversity reception and single reception causes another problem. Specifically, because signals go through diversity part 107 during diversity reception, video signal output is delayed by the time necessary for selection or synthesis. However, because signals do not go through diversity part 107 during single reception, switching between diversity reception and single reception makes difference in delay time in video signal output, thus inhibiting smooth video display.

To address this problem, during single reception, diversity controller 110 sends a control signal to input terminal 107f of diversity part 107 in the following manner. The diversity part always selects the demodulated signal from one of tuners 103 and 104 to which power is supplied, or always synthesizes a first output signal, i.e. one of the demodulated signals from one of the digital demodulators connected to one of the tuners to which power is supplied, with a second output signal, i.e. the other demodulated signal from the other digital demodulator connected to the other tuner to which power supply is stopped, at a ratio of 1:0. According to this control signal, diversity part 107 selects or synthesizes the demodulated signals at the above ratio independently of the quality thereof.

With this structure, digital broadcast receiver 130 can avoid the influence of any leakage power, and select and synthesize the signals even during single reception, thus eliminating difference in delay time between diversity reception and single reception.

Fourth Exemplary Embodiment

Figure 4:
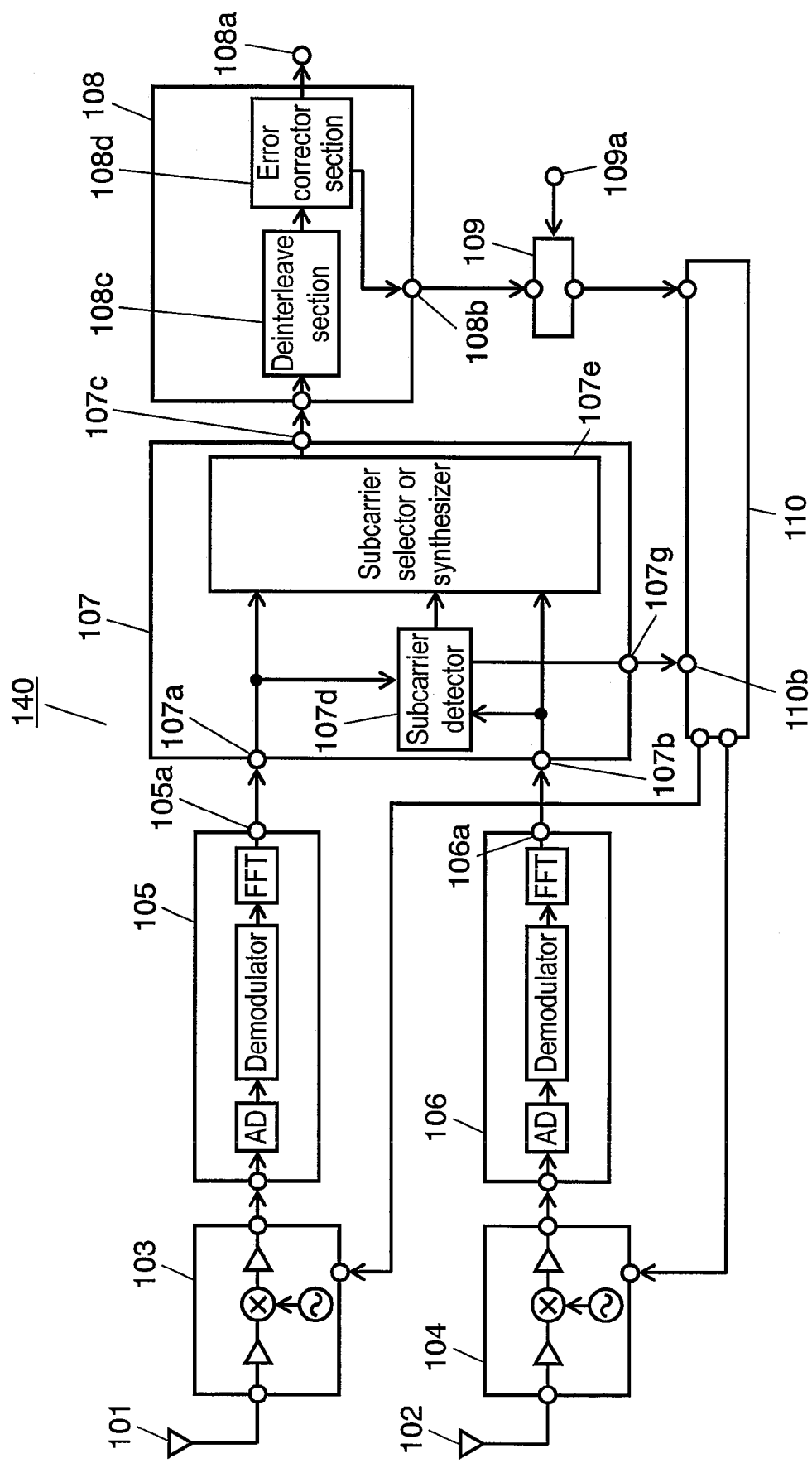
FIG. 4 is a block diagram of a digital broadcast receiver in accordance with a fourth exemplary embodiment of the present invention.

FIG. 4 is a block diagram of digital broadcast receiver 140 in accordance with the fourth exemplary embodiment of the present invention. For digital broadcast receiver 140 of this embodiment, diversity part 107 has another output terminal 107g, and diversity controller 110 includes another output terminal 110b in addition to the structure of the first embodiment in FIG. 1. Output terminal 107g of diversity part 107 is connected to input terminal 110b of diversity controller 110.

In the above structure, diversity controller 110 can refer to input terminal 110b for a selecting rate or synthesizing ratio from output terminal 107g of diversity part 107.

For the structure of the first embodiment in FIG. 1, during single reception, BER determining part 109 and diversity controller 110 cannot determine which one of antennas 101 and 102 has received radio-frequency (RF) signals in poorer reception conditions. For this reason, the diversity controller stops power supply to the tuner connected to one of the antennas having a smaller mean gain, for example. However, when antennas 101 and 102 have different directivities, one having a smaller mean gain can have larger received power than the other depending on the relation between the arrival direction of radio waves and the angle at which the user hold the receiving terminal. In this case, stopping power supply to the tuner connected to the antenna having a smaller mean gain can deteriorate reception conditions in some cases.

In the structure of this embodiment in FIG. 4, diversity controller 110 can tell which one of antennas 101 and 102 has received the signal set at a smaller selecting rate or synthesizing ratio in diversity part 107, by referring input terminal 110b for the selecting rate or synthesizing ratio supplied from output terminal 107g of diversity part 107 during single reception. Then, when BER determining part 109 supplies a determining signal for single reception, diversity controller 110 stops power supply to the tuner connected to one of the digital demodulators outputting a signal set at a smaller selecting rate or synthesizing ratio in diversity part 107.

In this manner, the reception conditions of one antenna outputting a signal set at a smaller selecting rate or synthesizing ratio are determined poorer than the reception conditions of the other antenna, and power supply to the tuner connected to the one antenna is stopped. This prevents the situation where the reception conditions are deteriorated by stopping power supply to the tuner connected to the antenna having a smaller mean gain. The power consumption can further be reduced by presetting a threshold of the selecting rate or synthesizing ratio in diversity controller 110, and stopping power supply to one of the tuners outputting a signal of which selecting rate or synthesizing ratio is up to the threshold. In other words, when the selecting rate or synthesizing ratio in diversity part 107 is smaller than a predetermined value, diversity controller 110 may stop power supply to the tuner connected to the digital demodulator outputting a signal set at a smaller selecting rate or synthesizing ratio. Thus, power consumption can further be reduced.

Specifically, for digital broadcast receiver 140 that includes two antennas having different directivities and diversity part 107 for performing diversity to select signals for each subcarrier, for example, 0.9 is set as a threshold of the selecting rate in diversity controller 110.

When the user receives radio waves, always facing to the same direction, in a reception environment having lopsided arrival directions of the radio waves, one of the antennas always receives larger power and the other antenna always receives smaller power because the two antennas have different directivities. In such a reception environment, diversity part 107 lopsidedly selects signals from the antenna having larger received power.

When the rate of selecting signals from one antenna is kept at a preset threshold of 0.9 or higher for every subcarrier, for a predetermined period, power supply to the tuner connected to the other antenna that substantially does not contribute to improvement of reception conditions is stopped independently of the determining signal from BER determining part 109 for single reception. This can further reduce power consumption.

Fifth Exemplary Embodiment

Figure 5:
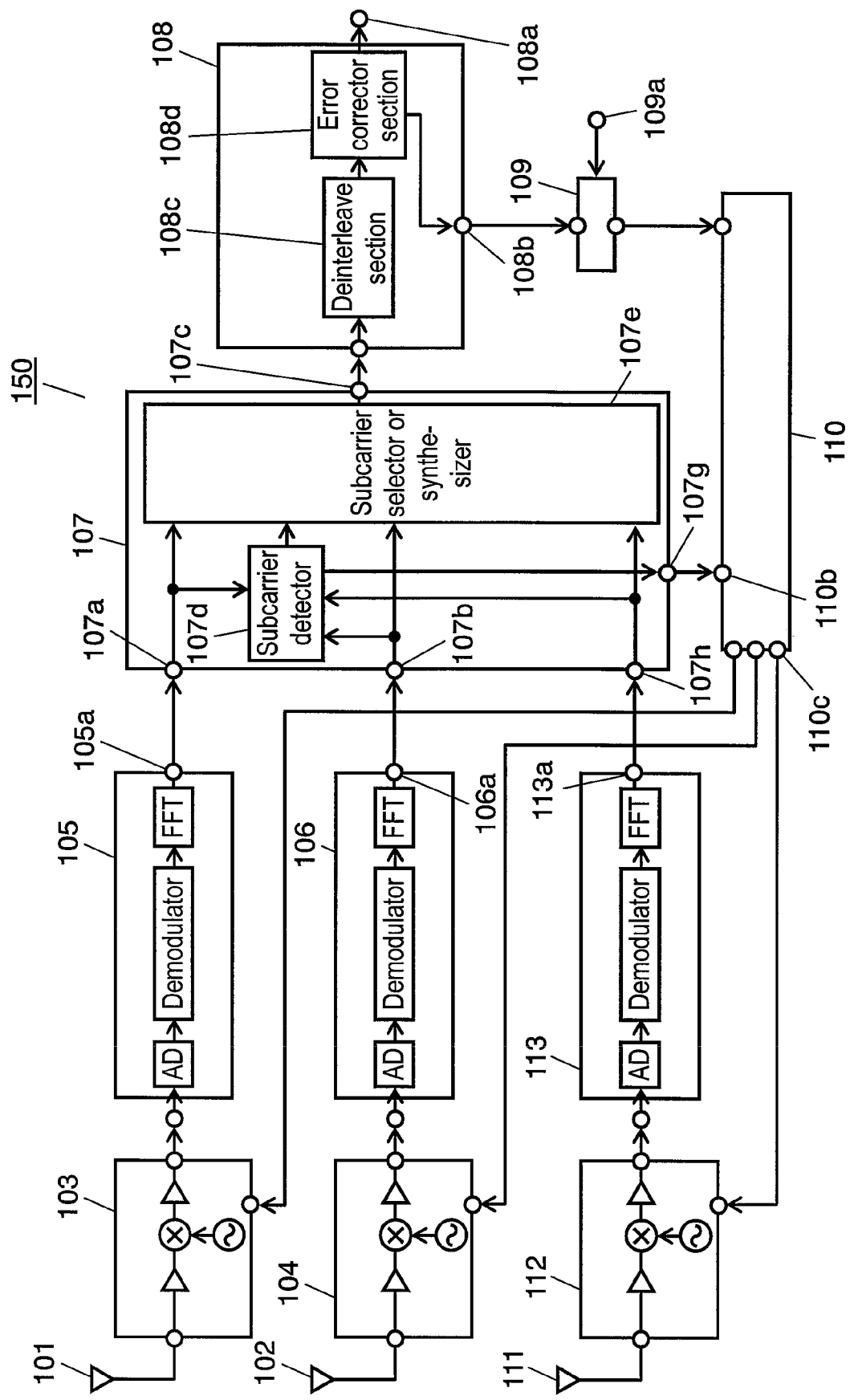
FIG. 5 is a block diagram of a digital broadcast receiver in accordance with a fifth exemplary embodiment of the present invention.

FIG. 5 is a block diagram of digital broadcast receiver 150 in accordance with the fifth exemplary embodiment of the present invention. Digital broadcast receiver 150 of this embodiment is structured of at least three bodies, in which antennas 101, 102, and 111, tuners 103, 104, and 112, and digital demodulators 105, 106, and 113, respectively, are directly connected in series, in contrast to the structure of the fourth embodiment in FIG. 4. The output signals from the digital demodulators in these serially connected bodies are independently supplied to diversity part 107. When the number of antennas is N (N≧3), as shown in FIG. 5, the output from Nth antenna 111 is connected to the input terminal of Nth tuner 112, the output terminal of tuner 112 is connected to the input terminal of Nth digital demodulator 113, output terminal 113a of digital demodulator 113 is connected to input terminal 107h of diversity part 107, and a power supply line for supplying power to tuner 112 is connected to output terminal 110c of diversity controller 110.

With such a structure, diversity controller 110 controls power supply to one or more of the N tuners to stop or start the tuners according to a determining signal supplied from BER determining part 109.

For diversity reception using two antennas, the two antennas are disposed so that the correlation between the received signals is low. However, in multipath environments or phasing environments, there can be places and time zones where the reception level of both antennas deteriorates. In these cases, selection or synthesis of the input signals from respective antennas cannot improve the reception conditions. However, the increased number of antennas decreases the chances that the reception levels of all the antennas deteriorate at the same time. Thus, a larger number of antennas enhance the improving effect.

However, as the number of antennas is increased, the number of serially connected bodies made of components from antennas 101, 102, and 111 to digital demodulators 105, 106, and 113 is also increased. Thus, control of power supply to respective tuners 103, 104, and 112 given by diversity controller 110 can considerably inhibit increases in power consumption.

Further, when four antennas are installed, in addition to diversity reception using four antennas and single reception using one antenna, the receiver can perform diversity reception using two or three antennas.

Specifically, for example, it is considered that three thresholds are preset as the thresholds of the BER after Viterbi in BER determining part 109. The thresholds are referred to as Threshold 1, Threshold 2, and Threshold 3, in decreasing order of value. When the BER after Viterbi is smaller than Threshold 1 during diversity reception using four antennas, BER determining part 109 outputs a determining signal for diversity reception using three antennas. At this time, diversity controller 110 refers to input terminal 110b for the selecting rate or synthesizing ratio from output terminal 107g of diversity part 107, and powers off only the tuner connected to the antenna in the poorest reception conditions. In the same manner, BER determining part 109 outputs a determining signal for diversity reception using two antennas, when the BER is smaller than Threshold 2. Likewise, BER determining part 109 outputs a determining signal for single reception, when the BER is smaller than Threshold 3.

In this manner, digital broadcast receiver 150 can attain both of high-quality reception and low power consumption.

Sixth Exemplary Embodiment

Figure 6:
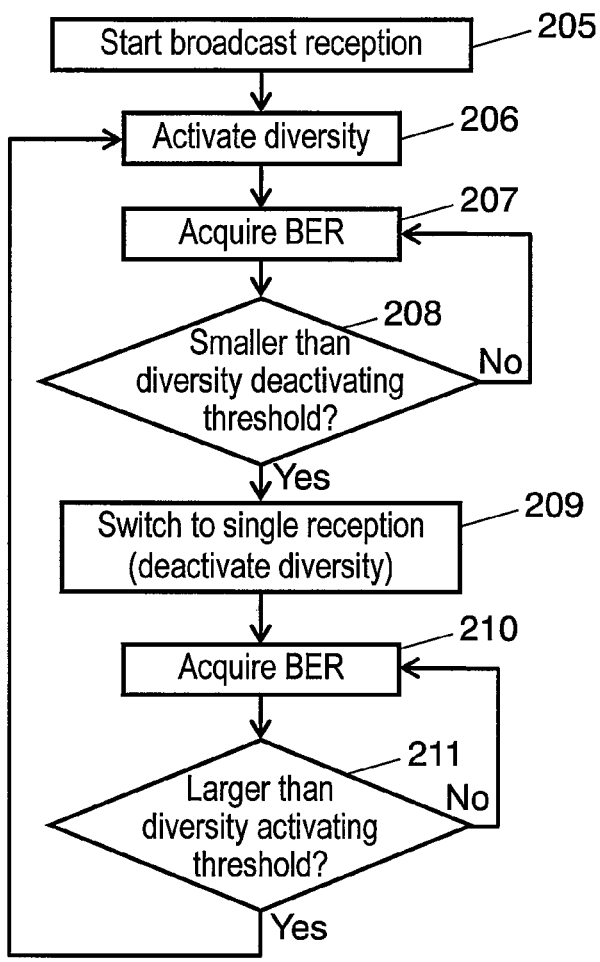
FIG. 6 is a flowchart for switching between diversity reception and single reception in accordance with a sixth exemplary embodiment of the present invention.
Figure 7:
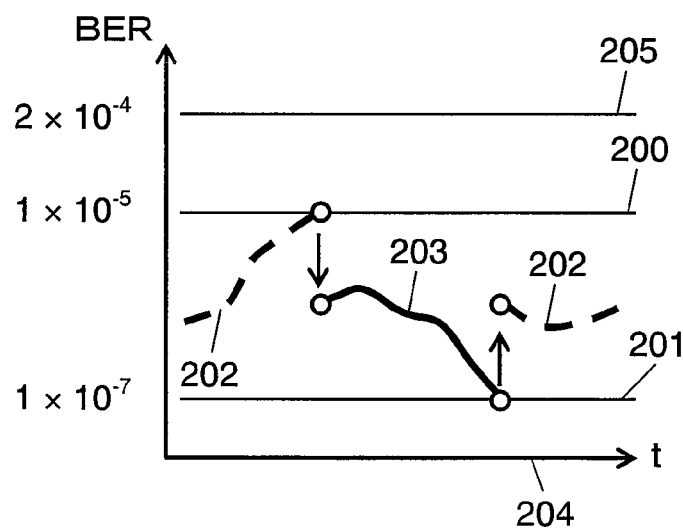
FIG. 7 is a graph showing variations in BER at activation and deactivation of diversity reception in accordance with the sixth exemplary embodiment of the present invention.

FIG. 6 is a flowchart for switching between diversity reception and single reception in the sixth exemplary embodiment of the present invention. FIG. 7 is a graph showing variations in BER at activation and deactivation of diversity reception of the sixth exemplary embodiment.

With reference to FIGS. 6 and 7, a description is provided of a further method of switching between diversity reception and single reception according to a BER in digital broadcast receivers 100, 120, 130, 140, or 150. Each of digital broadcast receivers 100, 120, 130, 140, and 150 of this embodiment includes a preset diversity deactivating threshold used for switching from diversity reception to single reception, and a preset diversity activating threshold used for switching from single reception to diversity reception. When the BER is smaller than the diversity deactivating threshold, power supply to one of the tuners is stopped for single reception, and when the BER is larger than the diversity activating threshold, power to the other tuner to which power supply has been stopped is supplied for diversity reception.

In response to a BER after Viterbi supplied from error corrector 108, as shown in FIG. 7, BER determining part 109 outputs a determining signal for diversity reception or single reception. BER determining part 109 includes the following two preset thresholds: diversity deactivating threshold 201 for switching from diversity reception to single reception and diversity activating threshold 200 for switching from single reception to diversity reception. The diversity controller takes control so that the BER after Viterbi is always kept up to threshold 205 specified by $2\times10^{-4}$. The control is detailed below.

FIG. 7 shows an example of variations in BER after Viterbi when $1\times10^{-5}$ is preset as diversity activating threshold 200, and $1\times10^{-7}$ is preset as diversity deactivating threshold 201. As shown in FIG. 7, dotted line 202 shows BERs after Viterbi during single reception, and solid line 203 shows BERs after Viterbi during diversity reception. Abscissa axis 204 shows time (t).

When the BERs after Viterbi are larger (poorer) than diversity activating threshold 200 during single reception, the receiver is switched to diversity reception. As shown in FIG. 7, initially, the BERs after Viterbi are smaller than diversity activating threshold 200. At a point where the BER after Viterbi is poorer than $1\times10^{-5}$, as shown by the downward arrow in the graph, the receiver is switched to diversity reception. In this manner, because the reception conditions can be improved by the diversity reception, the BERs after Viterbi become smaller discontinuously.

When the BERs after Viterbi are smaller (more excellent) than diversity deactivating threshold 201 during diversity reception, the receiver is switched to single reception. As shown by the upward arrow in FIG. 7, at a point where the BER after Viterbi is more excellent than $1\times10^{-7}$, the receiver is switched to single reception. Thus, switching from diversity reception to single reception deteriorates the reception conditions and increases the BERs after Viterbi discontinuously.

As described above, providing two thresholds, i.e. diversity activating threshold 200 and diversity deactivating threshold 201, allows BERs after Viterbi to be always kept up to $2\times10^{-4}$.

Hereinafter, a description is provided of a flowchart for switching between diversity reception and single reception in this embodiment, with reference to FIG. 6.

After broadcast reception is started (step 205), first, output of a determining signal for diversity reception activates diversity reception (step 206).

Next, a BER after Viterbi supplied from error detector 108 is acquired (step 207), and compared with diversity deactivating threshold 201 (step 208). When the BER after Viterbi is larger than diversity deactivating threshold 201 (No), the diversity reception continues and control returns to step 207. At this time, until the BER after Viterbi becomes smaller than diversity deactivating threshold 201, acquisition of a BER after Viterbi (step 207) and comparison with diversity deactivating threshold 201 (step 208) are repeated periodically.

When a BER after Viterbi is compared with diversity deactivating threshold 201 (step 208) and the BER after Viterbi is smaller than diversity deactivating threshold 201 (Yes), a determining signal for single reception is supplied. Responsive to this signal, diversity controller 110 stops power supply to one of the tuners and switches the receiver to single reception (step 209).

Next, a BER after Viterbi is acquired (step 210), and compared with the diversity activating threshold (step 211). When the BER after Viterbi is smaller than diversity activating threshold 200 (No), the single reception continues and control returns to step 210. At this time, until the BER after Viterbi becomes larger than diversity activating threshold 200, acquisition of a BER after Viterbi (step 210) and comparison with diversity activating threshold 200 (step 211) are repeated periodically.

When a BER after Viterbi is compared with diversity activating threshold 200 (step 211) and the BER after Viterbi is larger than diversity activating threshold 200 (Yes), a determining signal for diversity reception is supplied. Responsive to this signal, diversity controller 110 starts power supply to the other tuner to which power supply has been stopped, and switches the receiver to diversity reception (step 206).

Thereafter, a BER after Viterbi is periodically compared with diversity deactivating threshold 201 again.

With the above controlling operation, BER determining part 109 can control switching between diversity reception and single reception. Thus, as schematically shown in FIG. 7, BERs after Viterbi can be kept between two thresholds.

Seventh Exemplary Embodiment

FIG. 8 is a block diagram of digital broadcast receiver 160 in accordance with the seventh exemplary embodiment in FIG. 8. In digital broadcast receiver 160 of this embodiment, electronically-structured switches 114 and 115 are inserted between two antennas and tuners, and antenna-switching controller 116 is added to the structure of the first exemplary embodiment in FIG. 1. Switch 114 includes three input terminals 114a, 114b, and 114c, and one output terminal 114d. In this switch 114, input terminal 114c is a control input. Responsive to a control signal supplied to this input terminal 114c, input terminal 114a or 114b is short-circuited with output terminal 114d. Switch 115 includes two input terminals 115a and 115b, and two output terminals 115c and 115d.

In this switch 115, input terminal 115b is a control input. Responsive to a control signal supplied to this input terminal 115b, input terminal 115a is short-circuited with output terminal 115c or 115d.

In FIG. 8, in contrast to the structure of FIG. 1, the output of antenna 101, i.e. a first antenna, is connected to input terminal 114a of switch 114, i.e. a first switch, instead of tuner 103. Output terminal 114d of switch 114 is connected to the input terminal of tuner 103, i.e. a first tuner. The output of antenna 102, i.e. a second antenna, is connected to input terminal 115a of switch 115, i.e. a second switch, instead of tuner 104. Output terminal 115c of switch 115 is connected to input terminal 114b of switch 114, and output terminal 115d is connected to the input terminal of tuner 104, i.e. a second tuner.

Tuner 103 includes additional input terminal 103a, and digital demodulator 105 includes additional output terminal 105b. Output terminal 105b is connected to input terminal 103a of tuner 103.

Further provided is antenna-switching controller 116 including two input terminals 116a and 116b, and two output terminals 116c and 116d. Output terminal 116c is connected to input terminal 114c of switch 114, and output terminal 116d is connected to input terminal 115b of switch 115. Output terminal 105b of digital demodulator 105 is connected to input terminal 116a.

Diversity controller 110 includes additional output terminal 110d, which is connected to input terminal 116b of antenna-switching controller 116.

In the above structure, diversity controller 110 sends a control start signal or a control stop signal to input terminal 116b of antenna-switching controller 116 from output terminal 110d, to switch the receiver between diversity reception by selection or synthesis of the signals for each subcarrier (hereinafter referred to as "carrier diversity" in the seventh exemplary embodiment) and diversity reception by switching two antennas (antenna diversity).

In other words, when BER determining part 109 outputs a determining signal for diversity reception, diversity controller 110 supplies power to tuners 103 and 104, and sends a control stop signal to input terminal 116b of antenna-switching controller 116. Thus, antenna-switching controller 116 controls input terminal 114c of switch 114 from output terminal 116c. In other words, antenna-switching controller 116 short-circuits input terminal 114a and output terminal 114d and controls input terminal 115b of switch 115 from output terminal 116d to short-circuit input terminal 115a and output terminal 115d. Thus, radio-frequency (RF) signals received by antennas 101 and 102 are selected or synthesized in diversity part 107 via tuners 103 and 104 and digital demodulators 105 and 106, respectively, for carrier diversity reception.

When BER determining part 109 supplies a determining signal for single reception, diversity controller 110 stops power supply to tuner 104, and sends a control start signal to input terminal 116b of antenna-switching controller 116. Thus, antenna-switching controller 116 controls input terminal 115b of switch 115 from output terminal 116d, and short-circuits input terminal 115a and output terminal 115c.

In this manner, antenna-switching controller 116 controls input terminal 114c of switch 114 from output terminal 116c to select which one of antenna 101 and antenna 102 has received a RF signal to be connected to 103 for antenna diversity reception.

Hereinafter, a description is provided of operation of antenna diversity. Antenna-switching controller 116 outputs an antenna-switching control signal to input terminal 114c of switch 114, using an AGC voltage supplied from output terminal 105b of digital demodulator 105 to input terminal 103a of tuner 103. The AGC voltage is a signal for controlling the variable amplifier in tuner 103 so that the intermediate-frequency (IF) signal to be fed into digital demodulator 105 is at a predetermined level. The AGC voltage is a signal correlated with the predetermined signal reception level.

A switching threshold voltage is preset in antenna-switching controller 116. When the AGC voltage is smaller than the switching threshold voltage, an antenna switching signal is generated. When input terminal 114a and output terminal 114d of switch 114 are short-circuited, the RF signal received by antenna 101 is fed into tuner 103. Thus, the AGC voltage represents the reception level of antenna 101.

When the AGC voltage is smaller than the switching threshold, it is determined that the reception level of antenna 101 has become smaller. Then, input terminal 114b and output terminal 114d of switch 114 are short-circuited to feed the RF signal received by antenna 102 into tuner 103. Therefore, the AGC voltage represents the reception level of antenna 102, and thereafter this value is compared with the switching threshold voltage.

Antenna diversity is a method effective in so-called "line-of-site reception" environments, i.e. environments where radio waves arriving from a broadcasting station can directly be received, and at walking speeds where the phasing frequency is approx. 1 Hz. Therefore, antenna diversity gives smaller improving effect than carrier diversity. However, because only one tuner and digital modulator are sufficient, antenna diversity consumes considerably smaller power than carrier diversity. For this reason, in a relatively excellent reception environment, antenna diversity rather than single diversity can further improve reception conditions.

In the above description, for specific explanation, antenna diversity is structured to control the receiver using an AGC voltage supplied from digital demodulator 105. However, a CN ratio or BER can be used. The purpose of the present invention is to reduce power consumption and improve reception conditions by stopping power supply to one tuner for antenna diversity using two antennas in a relatively excellent reception environment. Thus, methods of specifically implementing the present invention include those using signals other than an AGC voltage.

Hereinafter, a description is provided of a method of switching between carrier diversity reception and antenna diversity reception. When BER determining part 109 outputs a determining signal for diversity reception, diversity controller 110 supplies power to tuners 103 and 104, and sends a control stop signal from output terminal 110d to input terminal 116b of antenna-switching controller 116. Thus, antenna-switching controller 116 controls input terminal 114c of switch 114 from output terminal 116c to short-circuit input terminal 114a and output terminal 114d Then, antenna-switching controller 116 controls input terminal 115b of switch 115 from output terminal 116d to short-circuit input terminal 115a and output terminal 115d. Thus, a signal received by antenna 101 and a signal received by antenna 102 are converted into respective demodulated signals for input into diversity part 107, where the signals are selected or synthesized for carrier diversity reception.

When BER determining part 109 outputs a determining signal for single reception, diversity controller 110 stops power supply to tuner 104, and sends a control start signal to input terminal 116b of antenna-switching controller 116 from output terminal 110d. Thus, antenna-switching controller 116 controls input terminal 115b of switch 115 from output terminal 116d to short-circuit input terminal 115a and output terminal 115c. Then, an antenna-switching control signal is supplied from output terminal 116c to input terminal 114c of switch 114 based on an AGC voltage supplied from input terminal 116a for antenna diversity reception.

As described above, because digital broadcast receiver 160 is capable of performing antenna diversity even in situations where the reception environment is too excellent for carrier diversity reception, thereby inhibiting increases in power consumption and further improving reception conditions.

INDUSTRIAL APPLICABILITY

A digital broadcast receiver of the present invention can provide excellent reception conditions using diversity reception and stops power supply to one tuner in excellent reception environments, thereby consuming considerably smaller power than a conventional digital broadcast receiver that always performs diversity reception. Thus, the receiver of the present invention is useful as a reception technology used particularly in a battery-powered portable terminal.

The invention claimed is:

1. A digital broadcast receiver for receiving an orthogonal frequency division multiplex (OFDM) digital signal, comprising:
a first antenna and a second antenna, for receiving the OFDM digital signal in a reception channel having a reception frequency;
a first tuner and a second tuner operating at the reception frequency and coupled to the first antenna and the second antenna, respectively, for converting the OFDM digital signal at the reception frequency into an intermediate-frequency (IF) signal;
a first digital demodulator and a second digital demodulator coupled to an output of the first tuner and an output of the second tuner, respectively, for converting the IF signal into a digital signal and demodulating the digital signal into a demodulated signal for output;
a diversity part coupled to the first digital demodulator and the second digital demodulator, for selecting or synthesizing the two demodulated signals for output; and
a diversity controller for starting a power supply to the first tuner and the second tuner for diversity reception and for stopping the power supply to one of the first tuner and the second tuner for single reception;
wherein, before the first tuner and the second tuner switch operating from the reception channel to another reception channel having another reception frequency, the diversity controller starts the power supply to the first tuner and the second tuner.

2. The digital broadcast receiver of claim 1, wherein the diversity controller stops the power supply to the one of the tuners and also stops the power supply to one of the digital demodulators coupled to the one of the tuners during signal reception.

3. The digital broadcast receiver of claim 1, wherein
the diversity part further includes an input terminal, and the diversity controller further includes an output terminal;
the output terminal of the diversity controller is coupled to the input terminal of the diversity part; and
during single reception, the diversity part synthesizes a first output signal from one of the digital demodulators coupled to one of the tuners to which power is supplied, and a second output signal from the other digital demodulator coupled to the other tuner to which the power supply is stopped, at a ratio of 1:0.

4. The digital broadcast receiver of claim 1, wherein
the diversity part further includes an output terminal, and the diversity controller further includes an input terminal;
the output terminal of the diversity part is coupled to the input terminal of the diversity controller; and
when the diversity controller stops the power supply to one of the tuners coupled to one of the digital modulators outputting the demodulated signal of which one of a selecting rate and synthesizing ratio is set smaller in the diversity part.

5. The digital broadcast receiver of claim 1, wherein
the diversity part further includes an output terminal and the diversity controller further includes an input terminal;
the output terminal of the diversity part is coupled to the input terminal of the diversity controller; and
when one of a selecting rate and synthesizing ratio in the diversity part is smaller than a predetermined value, the diversity controller stops the power supply to one of the tuners coupled to one of the digital modulators outputting the demodulated signal of which one of the selecting rate and synthesizing ratio is set smaller than a preset value.

6. The digital broadcast receiver of claim 1, including at least three bodies, each body comprising the antenna, the tuner, and the digital demodulator coupled in series, wherein an output signal from each of the digital demodulators is independently supplied to the diversity part, and the diversity controller controls power supply to the at least three tuners.

7. The digital broadcast receiver of claim 1, further including:
a first switch having one terminal coupled to the first antenna, and a common terminal coupled to an input terminal of the first tuner;
a second switch having a common terminal coupled to the second antenna, one terminal coupled to an input terminal of the second tuner, and an other terminal coupled to an other terminal of the first switch; and
an antenna-switching controller having a first control terminal and a second control terminal for controlling the first switch and the second switch, respectively, and controlling the first switch and the second switch responsive to a control signal from the diversity controller;
wherein, in case of diversity reception, the diversity controller supplies power to the first tuner and the second tuner, and, by controlling the first switch and the second switch via the antenna-switching controller, couples the first antenna and the second antenna to the first tuner and the second tuner, respectively; and
in case of single reception, the diversity controller stops power supply to one of the first tuner and the second tuner, and, by controlling the first switch and the second switch via the antenna-switching controller, selects one of the first antenna and the second antenna to be coupled to the other one of the tuners to which power is supplied.

8. The digital broadcast receiver of claim 1, further comprising a diversity activating button, wherein when the diversity activating button is pushed, the diversity controller effects diversity reception.

9. The digital broadcast receiver of claim 1, wherein the receiver is battery-powered, and when a remaining battery life thereof is up to a preset threshold, the diversity controller effects single reception.

10. The digital broadcast receiver of claim 1 further including;
- an error corrector coupled to the diversity part, having an output terminal for supplying a signal having undergone error correction, and supplying a bit error rate (BER);
- a BER determining part for receiving the BER, comparing the BER with a preset BER threshold, and supplying a determining signal;
- wherein when the BER is larger than the preset BER threshold, the diversity controller starts the power supply to the first tuner and the second tuner for diversity reception, and when the BER is smaller than the preset BER threshold, the diversity controller stops the power supply to one of the first tuner and the second tuner for single reception.

11. The digital broadcast receiver of claim 10, wherein
- the BER determining part includes a preset diversity deactivating threshold for switching from diversity reception to single reception, and a preset diversity activating threshold for switching from single reception to diversity reception;
- when the BER is smaller than the diversity deactivating threshold, the power supply to one of the tuners is stopped, for single reception; and
- when the BER is larger than the diversity activating threshold, power is supplied to the one of the tuners to which the power supply is stopped, for diversity reception.

12. The digital broadcast receiver of claim 10, wherein the BER determining part includes an input terminal with which the BER threshold can be set arbitrarily by external input.

* * * * *